United States Patent
Murray et al.

(10) Patent No.: US 9,876,674 B1
(45) Date of Patent: Jan. 23, 2018

(54) SYSTEMS AND METHODS FOR DETECTING SERVICE OUTAGES BASED ON AGGREGATE DEVICE SIGNALS

(71) Applicant: Google Inc., Mountain View, CA (US)

(72) Inventors: Abraham Murray, Scituate, MA (US); Jon Orwant, Brookline, MA (US); James Ronald Wilson, Littleton, MA (US)

(73) Assignee: Google LLC, Mountain View, CA (US)

( * ) Notice: Subject to any disclaimer, the term of this patent is extended or adjusted under 35 U.S.C. 154(b) by 242 days.

(21) Appl. No.: 14/269,113

(22) Filed: May 3, 2014

(51) Int. Cl.
*H04W 24/08* (2009.01)
*H04L 12/24* (2006.01)
*H04W 24/04* (2009.01)
*H04W 64/00* (2009.01)

(52) U.S. Cl.
CPC ........ *H04L 41/0677* (2013.01); *H04L 41/065* (2013.01); *H04W 24/04* (2013.01); *H04W 64/003* (2013.01)

(58) Field of Classification Search
None
See application file for complete search history.

(56) References Cited

U.S. PATENT DOCUMENTS

| | | | | |
|---|---|---|---|---|
| 2011/0207491 A1* | 8/2011 | Swaminathan | ....... | H04W 48/18 455/509 |
| 2013/0257623 A1* | 10/2013 | Bagasra | ............... | G08B 27/005 340/657 |
| 2014/0122140 A1* | 5/2014 | Rijnders | ................ | G06Q 30/01 705/7.13 |

FOREIGN PATENT DOCUMENTS

EP   1525713 B1 *   5/2013   ......... H04L 41/0604

OTHER PUBLICATIONS

Detection and analysis of large-scale Internet infrastructure outages: Proposal The Cooperative Association for Internet Data Analysis http://www.caida.org/funding/dals-satc/dals-satc_proposal.xm. http://downdetector.com/about-us/.

* cited by examiner

*Primary Examiner* — Robert C Scheibel
*Assistant Examiner* — Ayanah George
(74) *Attorney, Agent, or Firm* — Troutman Sanders LLP; James E. Schutz; Christopher C. Close, Jr.

(57) ABSTRACT

Techniques for detecting localized changes in a distributed service based on aggregate device signals. Certain implementations may leverage a plurality of networked nodal devices to serve as an ad-hoc sensor network for detecting changes in a service provided to the nodal devices. For example, status changes at each nodal device indicative of a disruption in a service provided to the nodal device may be reported and utilized to diagnose regional or localized disruptions in a common service received by a large group of devices. In some implementations, the service provided to the nodal devices may be a distributed service, for example, electric power or Internet access. The device signals may include reports from or based on status changes of mobile devices or other network-enabled electronic devices, such as changes in battery-charging status or network-connectivity of the respective mobile device.

17 Claims, 7 Drawing Sheets

SYSTEMS AND METHODS FOR DETECTING SERVICE OUTAGES BASED ON AGGREGATE DEVICE SIGNALS

BACKGROUND

Severe weather, mechanical failure, or human error can result in a loss of electric power to an entire area serviced by an electric utility company. More common, however, are smaller localized outages affecting pockets of customers.

In many instances, a power company relies on its customers to report power outages or other service interruptions. Many power companies now have automated telephone systems or web-enabled resources (e.g., websites or mobile apps), through which customers can provide notice of service interruptions. However, voluntary reporting from customers may not provide a power company with timely, comprehensive, or reliable notification of a power outage.

In some instances, a power company may be able to automatically detect a power outage to some extent through a diagnostic network. However, many such networks are currently only available in limited areas and may be susceptible to physical damage that may prevent network nodes from reporting. For example, if a fallen tree takes down a power line, reporting an associated outage through power-line communication (PLC) may not be possible.

Many users purchase Internet access through an Internet service provider (ISP). ISPs are also susceptible to service disruptions and face many of the same issues as power companies in detecting and assessing outages. Service outages resulting in a loss of Internet connectivity are frustrating and debilitating both to the direct customers of the ISPs, and also to third-parties that rely on reaching customers through their Internet connections.

ISPs typically have some ability to detect service outages. For example, an ISP may be able to automatically detect a loss of communication with customer premise equipment (e.g., a router) or plant equipment (e.g., a cable head-end). However, physical damage to the ISP's network may still impede detection and accurate assessment of the extent of a service outage. Moreover, an ISP may be unable to detect or effectively assess the scope of more complicated issues resulting in an effective denial or loss of service to customers, such as a misconfigured DNS. Accordingly, an ISP may also rely on customers to report service outages or changes in service quality.

Power companies, ISPs, and other utilities often provide notice of detected service outages through their phone systems and publicly accessible portals. However, this information may be delayed or suppressed such that it does not accurately reflect current outages within a service area. Accordingly, customers and interested third-parties, such as web service providers, may not have access to up-to-date information regarding service outages.

SUMMARY

Some or all of the above deficiencies may be addressed by certain implementations of the disclosed technology. Certain implementations include techniques for detecting localized changes in a distributed service based on aggregate device signals. In effect, certain implementations may leverage a plurality of networked nodal devices to serve as an ad-hoc sensor network for detecting changes in a service provided to the nodal devices. For example, status changes at each nodal device indicative of a disruption in a service provided to the nodal device may be reported and utilized to diagnose regional or localized disruptions in a common service received by a large group of devices.

In some implementations, the service provided to the nodal devices may be a distributed service, for example, electric power or Internet access provided by a utility or the like. The device signals may include reports from or based on status changes of mobile devices (e.g., smartphones, tablets, or laptops), home appliances (e.g., televisions, thermostats, or washing machines), motor vehicles, or other network-enabled electronic devices. By analyzing signals from a large number of nodal devices, localized service-level events resulting in a critical or threshold number of status changes may be distinguished from unrelated changes at individual devices (i.e., noise). The increasing ubiquity of network-enabled devices, particularly in urban and suburban environments, facilitates the detection of localized service-level events with improved timeliness, comprehensiveness, and reliability over conventional outage-detection schemes. Moreover, some implementations may effectively determine related outages across multiple service providers or service networks.

According to an example implementation, a method is provided. The method may include receiving, from each respective battery-operated device of a plurality of battery-operated devices, a respective indication of a change in battery-charging status of the respective battery-operated device. The respective indications of the changes in battery-charging status may be received by a computing device, for example at a central authority or server.

The method may further include, responsive to receiving, from each respective battery-operated device of the plurality of battery-operated devices, the respective indication of the change in battery-charging status of the respective battery-operated device, determining, based on timing data and location data associated with the changes in battery-charging status of the respective network-connected devices, that a change in network connectivity in the geographic region has occurred.

In a further implementation, the method may yet further include receiving the timing data or location data associated with the changes in battery-charging status from the respective battery-operated devices. Alternatively, a central authority or server may provide or establish one or more of the timing data or location data.

According to an example implementation, another method is provided. The method may include receiving from each respective network-connected device of a plurality of network-connected devices, a respective indication of a change in network connection status of the respective network-connected device. The respective indications of the changes in network connection status may be received by a computing device, for example at a central authority or server.

Each of the respective network-connected devices may have first and second network connection interfaces. Each of the changes in network connection status may be associated with the first interface of network connectivity for the respective network-connected device. The respective indications of the changes in network connection status may be received from each respective network-connected device through the second interface for network connectivity of the respective network-connected device.

The method may further include, responsive to receiving the respective indications of the changes in network-connection status of the respective network-connected devices, determining, based on timing data and location data associated with the respective changes in network-connection status of the respective network-connected devices, that an amount a change in network connectivity in the geographic region has occurred.

In a further implementation, the method may yet further include receiving one or more of the timing data and location data associated with the changes in network-connection status from the respective network-connected devices. Alternatively, a central authority or server may provide or establish one or more of the timing data and location data.

According to example implementation, yet another method is provided. The method may include receiving, for each respective network-connected device of a plurality of network-connected devices, an indication of a respective change in network connection status of the respective network-connected device. The indications of the respective changes in network connection status may be received by a computing device, for example at a central authority or server.

Each of the respective network-connected devices may have a stateful data connection with another device or party. Each status change of a respective network-connected device may be determined based on a change in the respective stateful data connection with the respective network-connected device.

The method may further include, responsive to receiving the indications of the respective changes in network-connection status of the respective network-connected devices, determining, based on timing data and location data associated with the respective changes in network-connection status of the respective network-connected devices, that a change in network connectivity in the geographic region has occurred.

In a further implementation, the method may yet further include receiving one or more of the timing data and location data associated with the respective changes in network-connection status from a third parties or devices in the stateful data connections with the respective network-connected devices. Alternatively, a central authority or server may establish one or more of the timing data and location data.

According to an example implementation, an additional method is provided. The method may include receiving from each respective network-connected device of a plurality of network-connected devices, a respective indication of a change in network connection status of the respective network-connected device. The respective indications of the changes in network connection status may be received by a computing device, for example at a central authority or server.

Each of the respective network-connected devices may have first and second network connection interfaces. Each of the respective changes in network connection status may be associated with the first interface of network connectivity for the respective network-connected device. The respective indications of the changes in network connection status may be received from each respective network-connected device through the second interface for network connectivity of the respective network-connected device.

The method may further include, responsive to receiving the respective indications of the changes in network-connection status of the respective network-connected devices, determining, based on timing data and network address data associated with the respective in network connection status of the respective network-connected devices, that a change in network connectivity in the network address block has occurred.

According to some example implementations, various systems are provided. Each system may include a computing device, and a memory operatively coupled to the computing device and configured for storing data and instructions that may be executed by the computing device. When executed, the respective system may be caused to perform a method substantially similar to one the methods described hereinabove.

According to additional example implementation, various computer program products are provided. Each computer program product may include a non-transitory computer readable medium. The respective computer readable medium may store instructions that, when executed by at least one processor in a system, cause the processor to perform a method substantially similar to one of the methods described hereinabove.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Implementations of the disclosed technology include techniques for detecting localized changes in a distributed service based on aggregate device signals. For example, one implementation may detect power outages associated with a geographic region based on contemporaneous changes in battery-charging status among battery-operated devices in the geographic region. Another example implementation may detect Internet service outages associated with a geographic region based on contemporaneous losses of Internet connectivity among network-enabled devices in the geographic region. Yet another example implementation may detect Internet service outages associated with a network address block or domain based on contemporaneous losses of Internet connectivity among network-enabled devices associated with the network address block or domain.

In some implementations, a change in status at a device may be automatically reported by the device without human prompting or action. For example, a switch of a battery-operated device from using a fixed power supply to using battery power may be automatically reported by the device undergoing the change. In another example, a change in Internet connection status of a mobile device from Wi-Fi data connectivity to mobile-broadband (e.g., cellular) network data connectivity may be automatically reported by a device undergoing the change.

In some implementations, timing, location, network address, speed, acceleration, or other data associated with a change at the device may be automatically reported by the device to a central authority or other signal aggregator. Device- or user-identifying data may also be communicated. Accordingly, device participation in the implementations described herein may be provided or enabled on an opt-in or opt-out basis, and the type and extent of information reported may be customizable by a user.

In another implementation, a change in status of a device may be determined by an external entity without receiving a report of the change in status from the device itself. For example, a change in status of a device may be determined based on an observed change in a preexisting or ongoing activity of the device. In one such implementation, the loss of a preexisting stateful data connection with a network-connected device may be detected and utilized to determine a service outage.

In the following description, the disclosed technology is described primarily in the context of detecting outages in utility services such as electric power and Internet access based on status changes of mobile devices. However, the techniques disclosed herein may be applicable to other types of distributed services, and for detecting other changes in service availability, performance, etc. based on status changes at various network-enabled electronic devices including home appliances, motor vehicles, etc.

Some implementations of the disclosed technology will be described more fully hereinafter with reference to the accompanying drawings. The disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "one implementation," "an implementation," "example implementation," "some implementations," "certain implementations," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

In some instances, a computing device may be referred to as a mobile device, mobile computing device, a mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In other instances, a computing device may be a processor, controller, or a central processing unit (CPU). In yet other instances, a computing device may be a set of hardware components.

A presence-sensitive input device as discussed herein, may be a device that accepts input by the proximity of a finger, a stylus, or an object near the device. A presence-sensitive input device may also be a radio receiver (for example, a WiFi receiver) and processor which is able to infer proximity changes via measurements of signal strength, signal frequency shifts, signal to noise ratio, data error rates, and other changes in signal characteristics. A presence-sensitive input device may also detect changes in an electric, magnetic, or gravity field.

A presence-sensitive input device may be combined with a display to provide a presence-sensitive display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display may have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as a personal digital assistant (PDA), satellite navigation devices, mobile phones, and video games. Further, such displays may include a capture device and a display.

Various aspects described herein may be implemented using standard programming or engineering techniques to produce software, firmware, hardware, or any combination thereof to control a computing device to implement the disclosed subject matter. A computer-readable medium may include, for example: a magnetic storage device such as a hard disk, a floppy disk or a magnetic strip; an optical storage device such as a compact disk (CD) or digital versatile disk (DVD); a smart card; and a flash memory device such as a card, stick or key drive, or embedded component. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various systems, methods, and computer-readable mediums may be utilized for detecting localized changes in a distributed service based on aggregate device signals and will now be described with reference to the accompanying figures.

Figure 1:
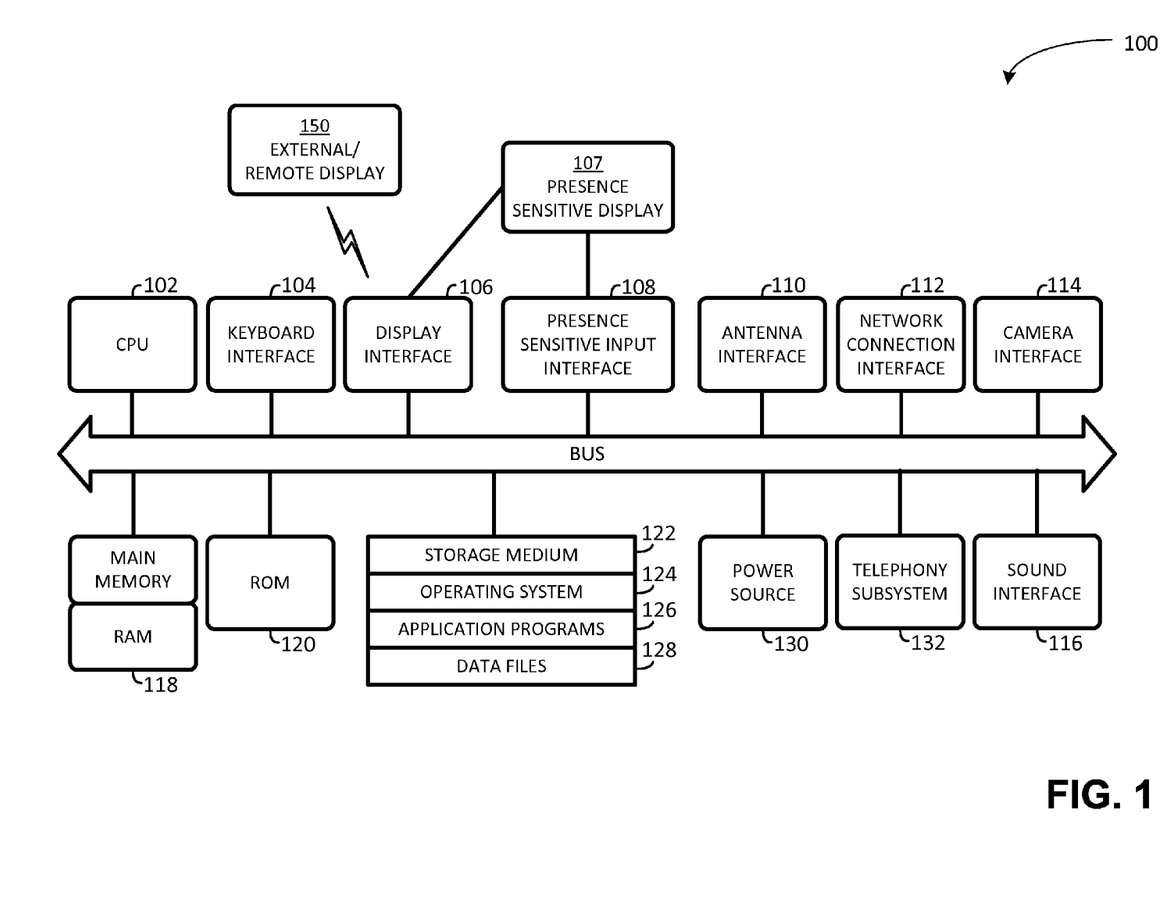
FIG. 1 depicts a block diagram of illustrative computing device architecture 100, according to an example implementation.

FIG. 1 depicts a block diagram of illustrative computing device architecture 100, according to an example implementation. Certain aspects of FIG. 1 may be embodied in a computing device (for example, a dedicated server computer or a mobile computing device). As desired, embodiments of the disclosed technology may include a computing device with more or less of the components illustrated in FIG. 1. It will be understood that the computing device architecture 100 is provided for example purposes only and does not limit the scope of the various embodiments of the present disclosed systems, methods, and computer-readable mediums.

The computing device architecture 100 of FIG. 1 includes a CPU 102, where computer instructions are processed; a display interface 106 that acts as a communication interface and provides functions for rendering video, graphics, images, and texts on the display. According to certain some embodiments of the disclosed technology, the display interface 106 may be directly connected to a local display, such as a touch-screen display associated with a mobile computing device. In another example embodiment, the display interface 106 may be configured for providing data, images, and other information for an external/remote display that is not necessarily physically connected to the mobile computing device. For example, a desktop monitor may be utilized for mirroring graphics and other information that is presented on a mobile computing device. According to certain some embodiments, the display interface 106 may wirelessly communicate, for example, via a Wi-Fi channel or other available network connection interface 112 to the external/remote display.

In an example embodiment, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 104 that provides a communication interface to a keyboard. In one example embodiment, the computing device architecture 100 may include a presence-sensitive display interface 107 for connecting to a presence-sensitive display. According to certain some embodiments of the disclosed technology, the presence-sensitive display interface 107 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 104, the display interface 106, the presence sensitive display interface 107, network connection interface 112, camera interface 114, sound interface 116, etc.) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example embodiments of the computing device architecture 100 may include an antenna interface 110 that provides a communication interface to an antenna; a network connection interface 112 that provides a communication interface to a network. According to certain embodiments, a camera interface 114 is provided that acts as a communication interface and provides functions for capturing digital images from a camera. According to certain embodiments, a sound interface 116 is provided as a communication interface for converting sound into electrical signals using a microphone and for converting electrical signals into sound using a speaker. According to example embodiments, a random access memory (RAM) 118 is provided, where computer instructions and data may be stored in a volatile memory device for processing by the CPU 102.

According to an example embodiment, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example embodiment, the computing device architecture 100 includes a storage medium 122 or other suitable type of memory (e.g., RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example embodiment, the computing device architecture 100 includes a power source 130 that provides an appropriate alternating current (AC) or direct current (DC) to power components. According to an example embodiment, the computing device architecture 100 includes a telephony subsystem 132 that allows the device 100 to transmit and receive sound over a telephone network. The constituent devices and the CPU 102 communicate with each other over a bus 134.

According to an example embodiment, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 125 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example embodiment, the term computing device, as used herein, may be a CPU, or conceptualized as a CPU (for example, the CPU 102 of FIG. 1). In this example embodiment, the computing device may be coupled, connected, and/or in communication with one or more peripheral devices, such as display.

In some embodiments of the disclosed technology, the computing device may include any number of hardware or software applications that are executed to facilitate any of the operations. In some embodiments, one or more I/O interfaces may facilitate communication between the computing device and one or more input/output devices. For example, a universal serial bus port, a serial port, a disk drive, a CD-ROM drive, or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various embodiments of the disclosed technology and/or stored in one or more memory devices.

One or more network interfaces may facilitate connection of the computing device inputs and outputs to one or more suitable networks or connections; for example, the connections that facilitate communication with any number of sensors associated with the system. The one or more network interfaces may further facilitate connection to one or more suitable networks; for example, a local area network, a wide area network, the Internet, a cellular network, a radio-frequency network, a Bluetooth-enabled network, a Wi-Fi-enabled network, a satellite-based network, any wired network, any wireless network, etc., for communication with external devices (for example, nodal devices 201) or systems.

Example Detection Systems

Figure 2:
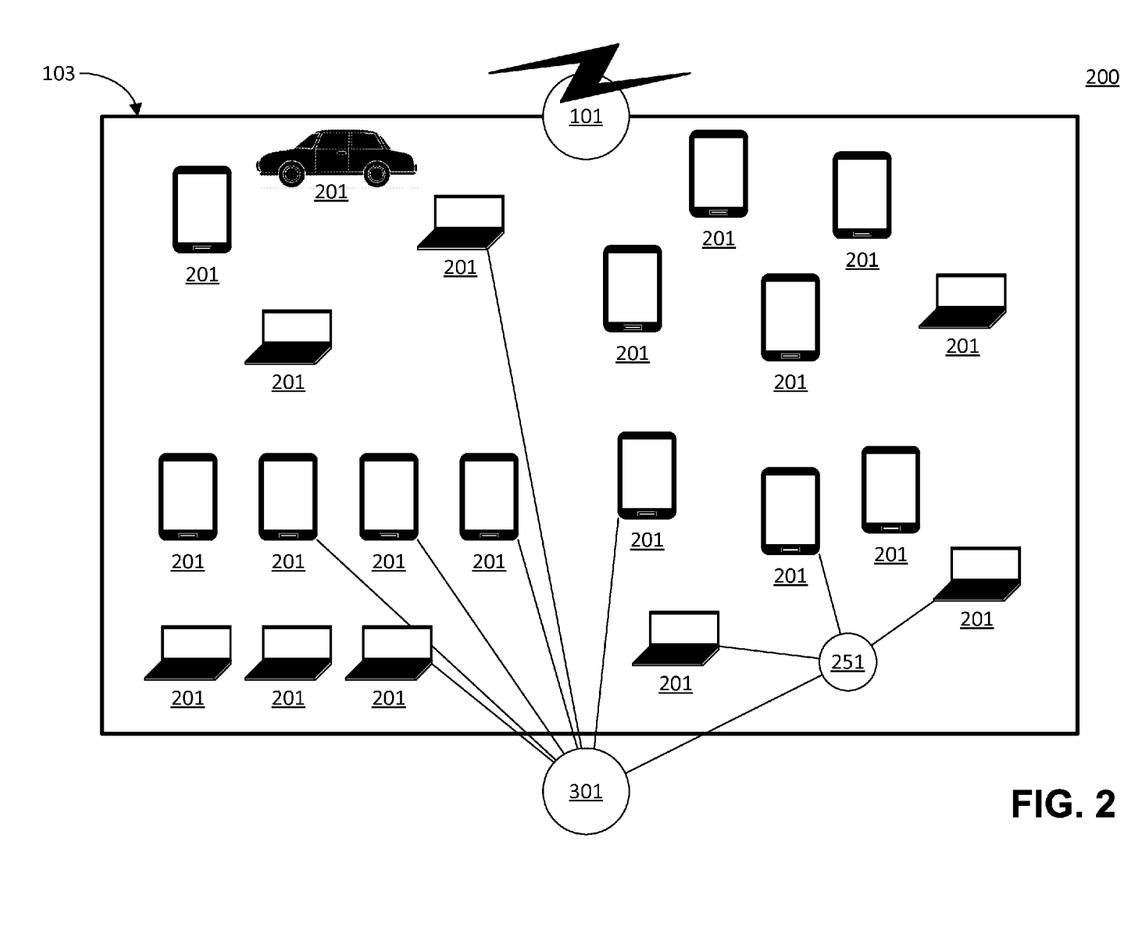
FIG. 2 is a schematic diagram 200 of a system for detecting localized changes in a distributed service based on aggregate device signals, according to an example implementation

FIG. 2 is a schematic diagram 200 of a system for detecting localized changes in a distributed service based on aggregate device signals, according to an example implementation. As shown in FIG. 2, the service-outage detection system may include a service provider 101, a plurality of nodal devices 201, and a central authority 301. In some implementations, the service provider may provide or distribute a service directed to or receivable by each of the plurality of nodal devices. The nodal devices may be configured to receive, or otherwise participate in, service from the service provider. The central authority may determine service outages in the service provided by the service provider based on analyzing device signals corresponding to status changes at a portion of the nodal devices. Thus, participating nodal devices may serve, in effect, as an ad-hoc sensor network for determining changes in an availability or quality of service.

In some implementations, the service provider 101 may be a utility service provider, such as an ISP or a power company as shown in FIG. 2. The service provider may provide service within a service area 103 over a network or other means of distribution. In some implementations, the network may be a terrestrial network, for example, a power grid or fiber network. In another implementation, the network may be wireless, for example, a cellular network or satellite network. In some implementations, multiple service providers may provide, to overlapping services areas or groups of customers, a same, similar, comparable, or related type of service. In another implementation, a service may be provided by a service provider over infrastructure shared between multiple service providers.

In some implementations, the central authority 301 may be a computing device or system including all or a portion of the computing device architecture 100 depicted in FIG. 1. In an example implementation, the central authority may be in communication with a subset of the serviced nodal devices 201, as shown in FIG. 2, and messages originating from the nodal devices may be directed to the central authority.

By receiving and analyzing signals from nodal devices 201, a change or disruption in service provided by a service provider 101 to the nodal devices may be determined. For example, reports of status changes of nodal devices may be aggregated at the central authority 301 and binned or categorized according to various factors such as time, geographic location, network address, etc. The central authority may then determine a service change or event based on an amount or distribution of reported status changes meeting a certain threshold or profile. A critical observation is that, if a threshold number of status changes fall into a same bin, then at least a portion of them are likely related, for example, resulting from a same change in service.

Note that a central authority does not have to receive an indication of a status change for, nor be in communication with, each and every nodal device receiving service from a service provider in a particular service area. In some implementations, participating nodal devices 201 may be limited to devices made by a particular manufacturer, devices based on a particular mobile platform, devices with a corresponding app installed, devices with the functionality activated by a user setting, etc.

In an example implementation, the central authority 301 may determine that, an amount of nodal devices 201 in a same location all having undergone a same or similar status change within a predetermined duration of time is indicative of a disruption in service to nodal devices in that location. In some implementations, a suitable duration of time may be fractions of a second, and in other implementations, minutes or longer depending on a type of service, distribution means, or various other factors. In some implementations, the duration may correspond to a cycle or other recurring period associated with the service.

Figure 7:
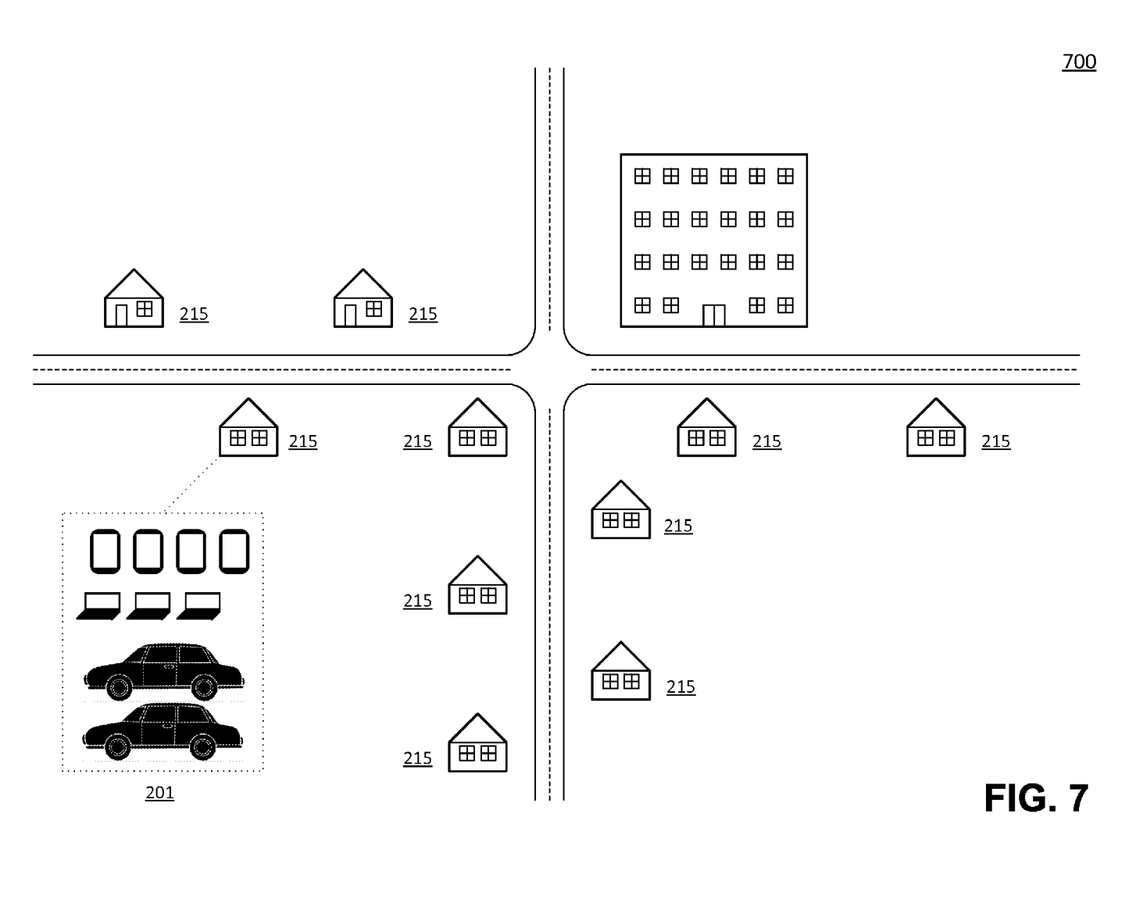
FIG. 7 depicts a schematic diagram 700 an illustrative residential neighborhood, according to an example implementation.

In some implementation, a location may be a geographic region. The geographic region may correspond to a city, district, zone, neighborhood, block, building, etc. For example, FIG. 7 depicts a schematic diagram 700 an illustrative residential neighborhood, according to an example implementation. As shown in FIG. 7, each residence 215 or building in the neighborhood may be associated with several nodal devices 201. In an example scenario, the residences may receive electric power from a same service provider 301. However, residences at each quadrant of the intersection may receive power through different distribution transformers. Accordingly, a malfunction or leak at one the distribution transformers may cause a disruption in power to, and a corresponding status change at nodal devices in the respective quadrant.

In another implementation, the bounds of the geographic region may be defined to include a predetermined or desired amount or density of nodal devices 201. In some implementations, a location or geographic region may correspond to a technical division of a service area, such as a hex corresponding to a cellular radio cell, or an administrative division.

In some implementations, the threshold amount of status changes necessary to trigger a determination of a service change may scale or vary with the size of a corresponding time window, the size of a corresponding geographic area, or another classifying or distinguishing criterion.

In another implementation, the threshold may be based on recent changes in a service. For example, it may be anticipated that a service outage among a group of nodal devices 201 in a geographic location will be followed by a restoration of service to at least some of the same devices. Thus, the threshold for detecting a restoration of service may be reduced in light of the expected event. Moreover, some of the devices whose status changes were considered in the first determination may have been deactivated or removed from the geographic region before the restoration of service. Accordingly, reports from these devices may not be received or may no longer be relevant. Thus, consecutive or otherwise related reports from a same nodal device at same location or network address may be given more weight in regards to determining related service events.

In another implementation, a threshold may be based on a baseline or historical status-change data. For example, a baseline of nominal status-change data may be established during periods of confirmed service uptime or normal performance, and reported aggregate status change activity during subsequent periods of time compared to the baseline. The baseline may be established for certain times of the day; days of the week, month, or year; holidays, or other reoccurring events. In another implementation, a threshold may be based on current events such as inclement weather, protests, military action.

In another implementation, a threshold may be based on recent changes in a same or similar service from another service provider. For example, a determined or confirmed outage at one service provider may be predictive of an outage at another service provider, especially if the service providers share infrastructure or are otherwise at least partially in proximity.

In another implementation, a threshold may be based on recent changes in a complimentary or related service. For example, some network-connected devices are not battery powered, or communicate via equipment (e.g., switches, routers) that is not battery powered. Accordingly, a regional loss of electric utility power may result in a corresponding regional loss of communication with these devices. Such chain reactions may result in false-positive reports. These reports may be discounted when knowledge of related service outages is available.

In another implementation, machine learning may be used to set appropriate thresholds. The training data may be obtained by observing status changes at nodal devices and correlating the status changes with outage events reported by power companies. Techniques for implementing machine learning are known in the art and not discussed at length herein.

By analyzing signals from a large number of nodal devices 201, a change or disruption in service (e.g., a power outage or degradation in network performance) may be determined with improved timeliness, comprehensiveness, and reliability over conventional detection schemes. For example, the increasing ubiquity of network-enabled devices, particularly in urban and suburban environments, may provide a dense sensor network facilitating detection of localized service-level events with improved timeliness, comprehensiveness, and reliability over conventional outage detection schemes. For example, certain implementations may be effective in identifying block-level or building-specific service outage events.

Moreover, some implementations may effectively determine related outages across multiple service providers 101 or networks. For example, a large scale disaster may result in service outages across multiple types of services. In another example, two service providers providing a same or similar service may both experience outage issues in a same, or overlapping service areas. This may indicate an underlying problem it at least partially related to service distribution infrastructure shared between the service providers.

In another implementation, the nodal devices 201 may be in communication with, and direct messages to, an intermediary 251. In some implementations, an intermediary 251 may be a computing device or system including all or a portion of the computing device architecture 100 depicted in FIG. 1. In an example implementation, the intermediary may perform a first aggregation or analysis of device signals from the nodal devices before sending an indication thereof to the central authority 301 or another intermediary.

As shown in FIG. 2, a nodal 201 device may be an electronic device such as mobile computing device (e.g., a smartphone or a laptop). In certain implementations, a group of nodal devices receiving service from a same service provider 301 may be substantially homogenous across a category or type, for example, being all smartphones, being all from a same manufacture, receiving a same tier of service, etc. In another implementation, the serviced group of nodal devices may vary across these categories and others.

In some implementations, a nodal device 201 may include one or more network interfaces. As used herein, a "network interface" may refer to one or more of software, firmware, or hardware providing or enabling connection to a network. In some implementations, the network interface may provide a wireline or terrestrial connection to a network. Examples of terrestrial connections include, without limitation, digital subscriber line (DSL), cable modem, dial-up, and broadband over power line (BPL) connections. In another implementation, the network interface may provide a wireless connection. Examples of wireless connections include, without limitation, connections via mobile broadband technologies such as GSM, CDMA, and WiMax, and also satellite connections.

As used herein, a network connection may be categorized as either "terrestrial" or "wireless" based on a primary means of network access rather than a "last-mile" connection. For example, a short-range wireless connection may be treated as a terrestrial connection in situations where the wireless connection facilitates access to a primary terrestrial network connection. Thus, a network interface at a nodal device 201 for connecting to a Wi-Fi network facilitating sharing of a cable modem connection, for example, may be referred to as providing a terrestrial network connection.

In certain implementations, a nodal device 201 may be powered by a battery or by an alternate fixed power supply such as through a conventional power outlet or cigarette lighter receptacle. Such a device may be referred to herein as a "battery-operated device." In some implementations, the battery may be chargeable by the nodal device, for example, when the nodal device is connected to the alternate power supply.

In some implementations, a change in a status of a nodal device 201 may result in generation of a corresponding status report or status message by the nodal device. For example, when a battery-operated device is plugged into an electrical outlet, its battery may begin charging and a corresponding logging or other notation of the event may be made by the battery-operated device. In another example, when a network-enabled device changes network connection status, such as by connecting or disconnecting from a network, a corresponding logging or other notation of the event may be made by the network-enabled device.

In some implementations, the notation or other indication of a status change may be reported or communicated to another device or party, such as a central authority 301 or an intermediary 251, as shown in FIG. 2. In an example implementation, the indication of the status change may be automatically communicated immediately or soon after the status change. In another implementation, automatic reporting may be delayed until a means of communication with a predetermined recipient becomes available or another predetermined condition is met. In an alternate implementation, user prompting or intervention may be required in order to send a status report. For example, the nodal device may prompt the user for permission or confirmation before sending or generating a report.

In some implementations, additional data associated with a status change may be reported by nodal device 201, including timing, location, network address, or other data. For example, the notation may include a timestamp indicating a time associated with the status change. In another implementation, the status change may be tagged with additional data available at or obtainable by the nodal device. For example, a notation may include GPS or other location data associated with the event. This data may be used during analysis of aggregate signal data by the central authority 301 to group the reported status changes, as described later herein.

Device- and user-identifying data may also be reported by the nodal device 201. Accordingly, device participation in the implementations described herein may be provided or enabled on an opt-in or opt-out basis, and the type and extent of information reported customizable by a user.

In some implementations, a change in status of a nodal device 201 may be determined without a report of the change in status being sent from the device itself. Instead, a report may be generated at another device or system, for example, at an intermediary 251, and directed to the central authority 301. In another example, the central authority may have sufficient information to determine a change in status of a nodal device without receiving a report of a status change from an external party.

For example, the change in status may be determined based on an observed change in a preexisting or ongoing activity of the device. In one implementation, a network-connected device may have an ongoing stateful data connection with a central authority 301 or an intermediary 251. Changes in the stateful connection with the nodal device 201 may indicate a disruption in a service provided to the nodal device 201. Such changes may be observed by the central authority or intermediary by virtue of the preexisting or ongoing connection with the nodal device. For example, an unexpected loss of contact with a nodal device or end to a stateful data connection with the nodal device may be an indication of a loss of service at the nodal device.

In another implementation, additional data associated with a status change, including timing, location, network address, or other data, may be already known or obtainable by an intermediary 251 or central authority 301 independent of a reporting from a nodal device 201 related to the instant status change. For example, address and other location data corresponding to the nodal device may be registered with or otherwise previously provided to the central authority. In another example, the location data may be available from one or more databases, or determined based on a network address or other property associated with the nodal device.

Example Detection Methods

Using some or all of the system architecture and flow described above, certain implementations may be effective in detecting and determining the scope of changes in various types of services.

In one implementation, the service-outage detection system 200 may detect power outages associated with a geographic region based on contemporaneous changes in battery-charging status among battery-operated devices in the geographic region.

In an example scenario, a localized power outage in a region may leave homes and businesses in the region without electric power. Accordingly, electronic devices located in the homes and businesses that are dependent on receiving a fixed power supply may turn off or deactivate. However, battery-operated devices may switch to and continue to operate on battery power. For the battery-operated devices that may also connect to a communications network (e.g., mobile devices), the loss of power at a respective battery-operated device may be reported over the respective communications network by the respective battery-powered device. If a enough battery-operated devices in the region switch to battery power within a predetermined period of time, the corresponding spike in status changes may be distinguished from random individual device- or user-specific events, such as a smartphone being unplugged during normal use. In another example, a sudden widespread change in device status to charging may indicate that electric power has been at least partially restored in a region, especially if a power outage was recently detected and many of the same devices are implicated in both determinations.

In another implementation, the service-outage detection system may detect Internet service outages associated with a geographic region based on contemporaneous losses of Internet connectivity among network-enabled devices in the geographic region. Although the following example is described in the content of Internet access or connectivity, a person of skill in the art will recognize the disclosed technique as applicable to other data networks.

In an example scenario, a localized Internet-access service outage may leave homes and businesses in a region without Internet access. Accordingly, electronic devices located in the homes and business configured to connect to the Internet through the service provider may lose Internet connectivity. However, electronic devices with a second means of accessing the Internet may switch over to or exclusively activate the second means of access. Thus, such electronic devices may still report the status change (e.g., loss of Internet connectivity through the first means of access) of the electronic device over the second means. Many smartphones and tablets are equipped with both Wi-Fi radios and cellular radios. The Wi-Fi radio may facilitate access to a primary terrestrial Internet connection while the cellular radio provides wireless Internet connectivity. Accordingly, when Internet connectivity through the underlying terrestrial connection is disrupted, the change in Internet connection status may be reported through the cellular connection, and vice versa.

In some implementations, a service outage or other service-level event may be localized according to other categories besides geographically. For example, a network connectivity issue may only affect network-enabled devices having a network address within a certain range. Accordingly, in one implementation, the service-outage detection system may detect Internet service outages associated with a network address block or domain based on contemporaneous losses of Internet connectivity among Internet-enabled devices associated with the network address block or domain. In another implementation, the system may distinguish or attribute outages to respective individual service providers 101.

As described above, a change in status may be determined based on an observed change in a preexisting or ongoing activity of the device. In an example scenario, a web service provider (or broker) may be an intermediary 251 in communication with a nodal device 201. The web service provider may be a streaming-media service provider. While streaming media to a nodal device, the web service provider may experience an unexpected loss of communication with the nodal device. This loss of communication may be an indication of a service disruption, for example, a loss of Internet connection, of the nodal device. In some implementations, the loss of communication may be reported to a central authority 301. In another implementation, the web service provider may experience contemporaneous loss of communication with multiple nodal devices, and report an indication of the aggregate connection loss to the central authority. The central authority may further aggregate reports of service disruptions from multiple web service providers. For example, connection losses from streaming-media, online-gaming, email, VoIP, and other web service providers may all be reported to a same central authority.

A person of skill in the art will recognize that other changes in a stateful connection may be observed and used to make a determination of a service outage or other event. For example, changes various connection characteristics, including bandwidth, throughput, latency, jitter, or error rate, may be observed and reported. Accordingly, in some implementations, a change in Internet connection status other than an absolute loss or restoration of connection may be determined.

Data Presentation

According to certain implementations, once a service outage or other change in service has been determined, interested parties may be automatically notified of the outage or change. In some implementations, these parties may include one or more of the service providers 301, the nodal devices 201, and third parties such as intermediaries 251.

For example, when a service outage is determined for a geographic region, a subset of nodal devices 201 (or users thereof) associated with the geographic region may be sent an indication of the outage. In some implementations, communication of the indication may be initiated by the central authority 301 or intermediary 251. In some implementations, the indication of the outage may be an SMS or other textual message directed to the nodal device or a user thereof.

In some implementations, the subset of nodal devices 201 may be or include nodal devices that were previously in the geographic region, or nodal devices that are currently in the geographic region. In another implementation, the subset may be or include nodal devices that reported a status change determined to be related to the service outage. In another implementation, the subset may be or include nodal devices expected to enter the geographic region, for example, in the near future or during an expected duration of a service outage. Various techniques for determining when a device (or associated user) is likely or scheduled to be at a predetermined location in the future are known in the art and not discussed at length herein.

In some implementations, the indication may be directed to a user associated with the nodal device 201 and sent to a user account or another device associated with the user besides the nodal device. For example, an indication of a power outage may be directed to an email account associated with a user of a nodal device. In another example, the navigation system of an electric vehicle maybe apprised of power outages at a user's home. The navigation system may then alert the user that they may be unable to recharge the vehicle at home.

The improved timeliness and granularity of service-outage detection afforded by certain implementations of the disclosed technology may enable a variety of other helpful services. For example, service-outage data may be used to provide a listing of areas (e.g., neighborhoods, blocks, buildings) or associated entities (businesses, governmental offices, families), currently affected by a determined outage in the form of a list, searchable database, map, etc. Thus, when a user desires a good or service typically provided at one of these locations or by one of these entities, the user may be apprised of unavailability resulting from a detected service outage.

In an example scenario, a user may wish to find gasoline in an area recently hit by a hurricane. Due to the natural disaster, many areas may be without utility electricity power, with spotty availability across the service area of the power company. Gas stations located in areas without service may be unable to pump gas. In another scenario, a user may wish to conduct a transaction at a bank. However, the user's local bank branch may lack the Internet connectivity required to complete or authorize the transaction due to a service outage. In yet another scenario, a user with an electric vehicle may wish to charge his car but has lost power at his home.

In some implementations, an indication of a desired good or service may be received from a user. A list of providers in the area capable of fulfilling the desire (i.e., providers that are still receiving service) may be provided to the user in turn. In another implementation, a user may query the system to determine whether a particular area or entity is fully operational.

In some implementations, a user may request other information concerning an area, entity, or other destination. For example, a user may request directions to a business location. The request for directions may be an indication that a user desires or expects to visit the location in the near future. In response to receiving this indication, service outage data may be provided to the user on any service outages the business may be experiencing. Thus, the user can be warned, for example, before arriving at a business unable to provide a desired service or good because of an outage. For example, extending the electric vehicle example described above, the navigation system may be apprised of the electric outage at the user's home and suggest an alternate location proximate to the user's home that still has power, for example, a neighbor or local retailer.

Flow Diagrams

Figure 3:
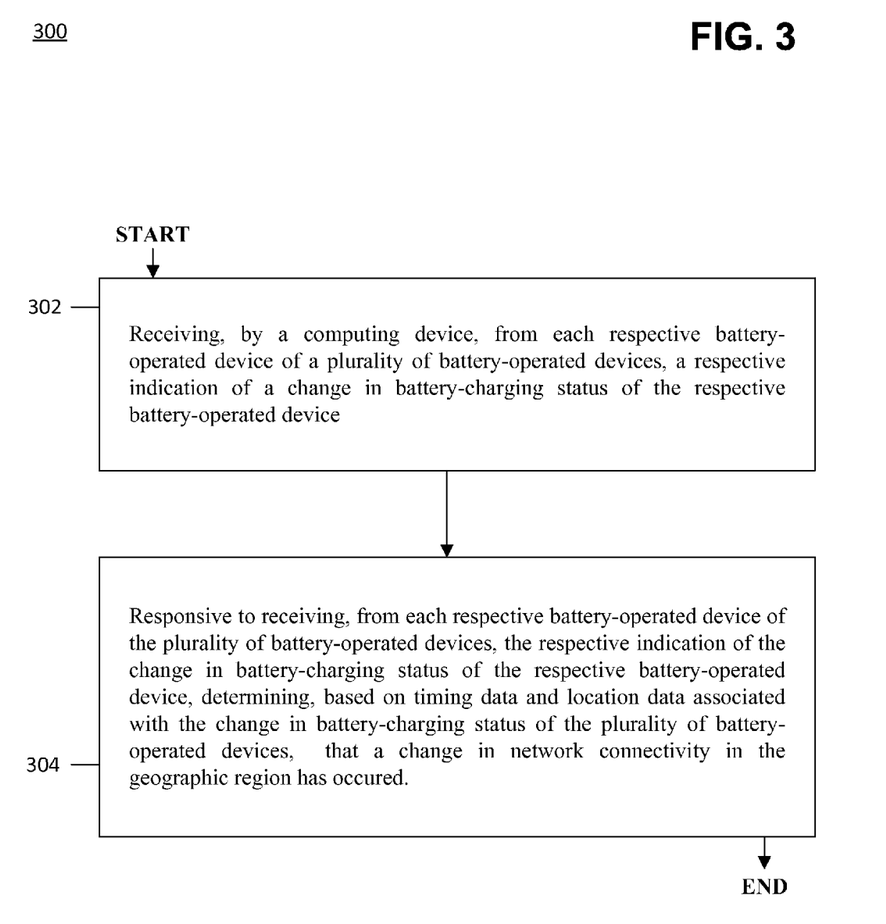
FIG. 3 depicts a flow diagram 300 of a method for detecting a localized power outage based on aggregate device signals, according to an example implementation.

FIG. 3 depicts a flow diagram 300 of a method for detecting a localized power outage based on aggregate device signals, according to an example implementation. As shown in FIG. 3, the method 300 starts in block 302, and, according to an example implementation, includes receiving, by a computing device, from each respective battery-operated device of a plurality of battery-operated devices, a respective indication of a change in battery-charging status of the respective battery-operated device.

In block 304, the method 300 includes, responsive to receiving, from each respective battery-operated device of the plurality of battery-operated devices, the respective indication of the change in battery-charging status of the respective battery-operated device, determining, based on timing data and location data associated with the change in battery-charging status of the plurality of battery-operated devices, that a change in electric power availability in the geographic region has occurred.

Figure 4:
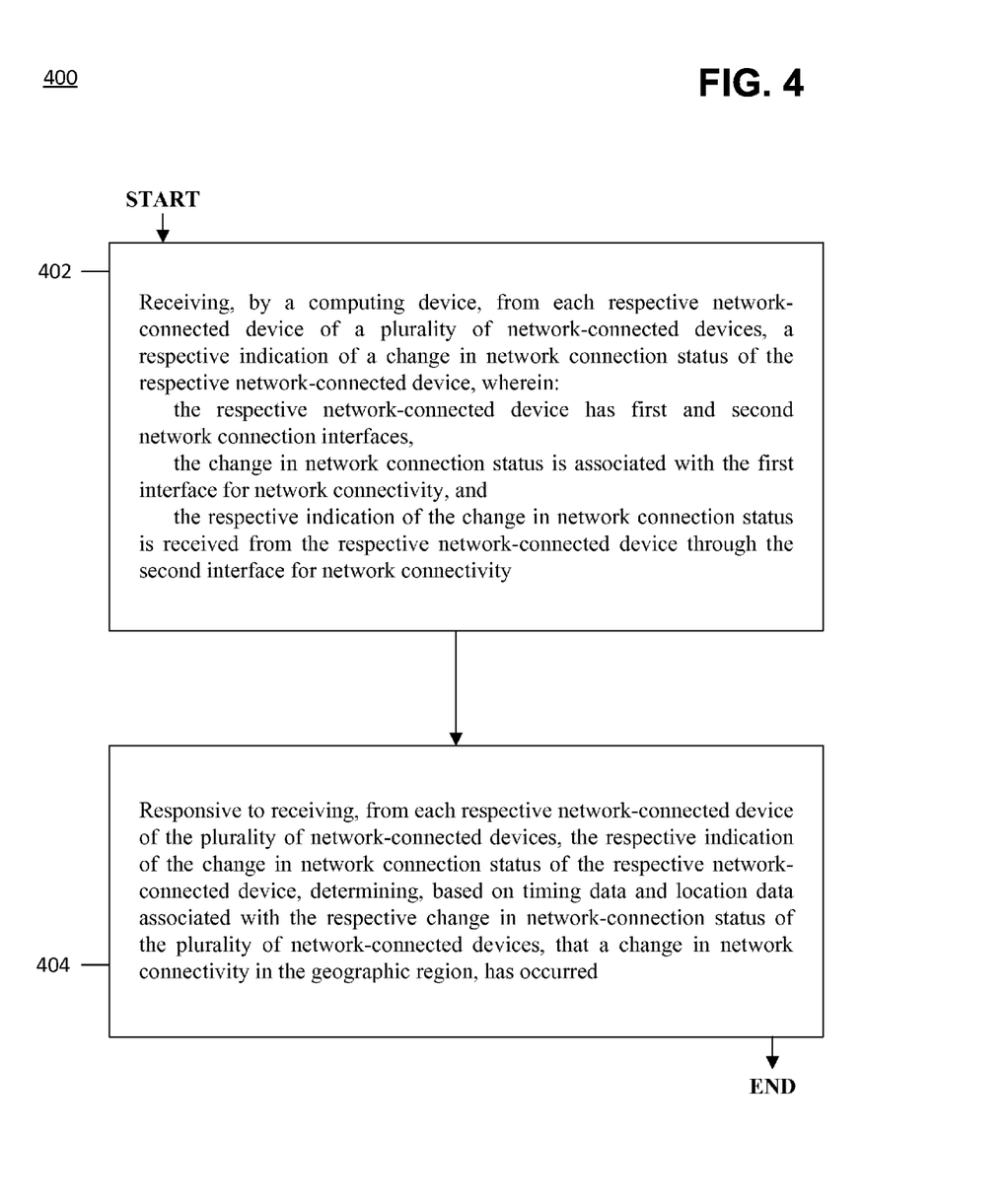
FIG. 4 depicts a flow diagram 400 of a method for detecting a localized change in Internet connectivity, according to an example implementation.

FIG. 4 depicts a flow diagram 400 of a method for detecting a localized change in Internet connectivity, according to an example implementation. As shown in FIG. 4, the method 400 starts in block 402, and, according to an example implementation, includes receiving, by a computing device, from each respective network-connected device of a plurality of network-connected devices, a respective indication of a change in network connection status of the respective network-connected device, wherein: the respective network-connected device has first and second network connection interfaces, the change in network connection status is associated with the first interface for network connectivity, and the respective indication of the change in network connection status is received from the respective network-connected device through the second interface for network connectivity.

In block 404, the method 400 includes, responsive to receiving, from each respective network-connected device of the plurality of network-connected devices, the respective indication of the change in network connection status of the respective network-connected device, determining, based on timing data and location data associated with the change in network-connection status of the plurality of network-connected devices that a change in network connectivity in the geographic region has occurred.

Figure 5:
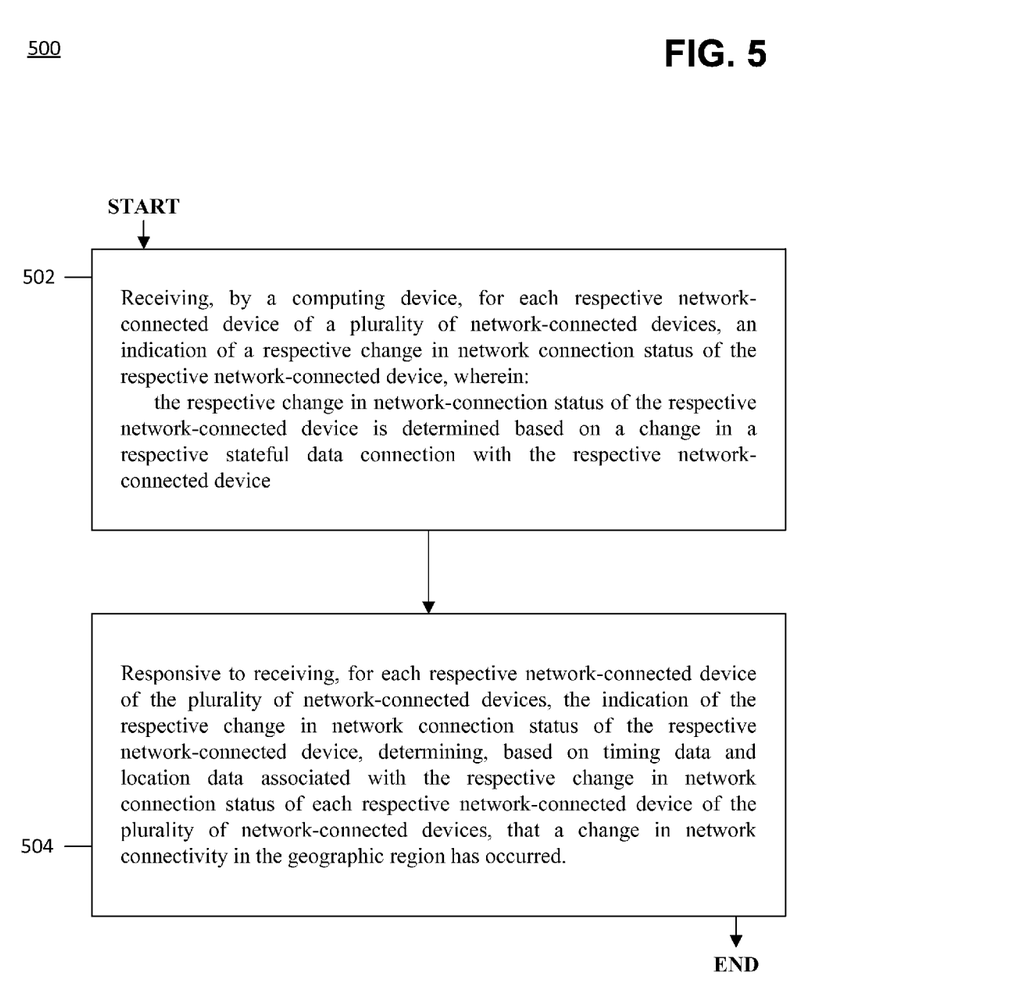
FIG. 5 depicts a flow diagram 500 of another method for detecting a localized change in Internet connectivity, according to an example implementation.

FIG. 5 depicts a flow diagram 500 of another method for detecting a localized change in Internet connectivity, according to an example implementation. As shown in FIG. 5, the method 500 starts in block 502, and, according to an example implementation, includes receiving, by a computing device, for each respective network-connected device of a plurality of network-connected devices, an indication of a respective change in network connection status of the respective network-connected device, wherein: the respective change in network-connection status of the respective network-connected device is determined based on a change in a respective stateful data connection with the respective network-connected device.

In block 504, the method 500 includes responsive to receiving, for each respective network-connected device of the plurality of network-connected devices, the indication of the respective change in network connection status of the respective network-connected device, determining, based on timing data and location data associated with the respective change in network connection status of each respective network-connected device of the plurality of network-connected devices, that a change in network connectivity in the geographic region has occurred.

Figure 6:
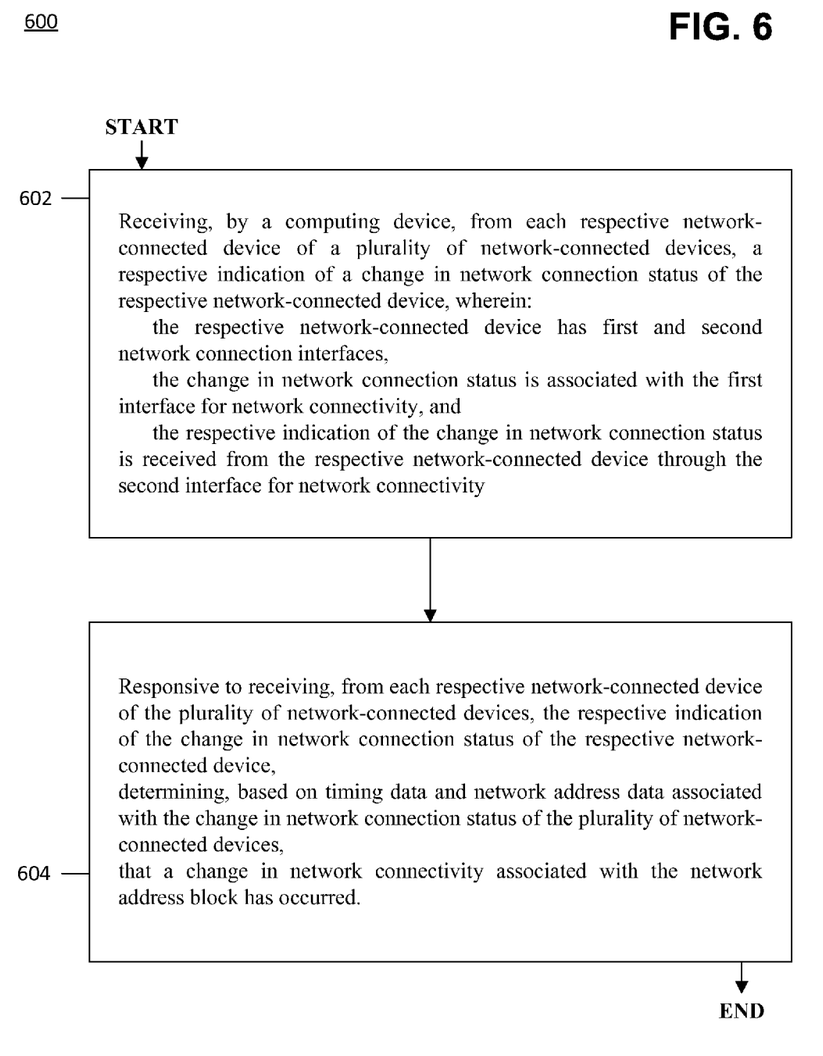
FIG. 6 depicts a flow diagram 600 of yet another method for detecting a localized change in Internet connectivity, according to an example implementation.

FIG. 6 depicts a flow diagram 600 of yet another method for detecting a localized change in Internet connectivity, according to an example implementation. As shown in FIG. 6, the method 600 starts in block 602, and, according to an example implementation, includes receiving, by a computing device, from each respective network-connected device of a plurality of network-connected devices, a respective indication of a change in network connection status of the respective network-connected device, wherein: the respective network-connected device has first and second network connection interfaces, the change in network connection status is associated with the first interface for network connectivity, and the respective indication of the change in network connection status is received from the respective network-connected device through the respective interface for network connectivity In block 604, the method 600 includes responsive to receiving, from each respective network-connected device of the plurality of network-connected devices, the respective indication of the change in network connection status of the respective network-connected device, determining, based on timing data and network address data associated with the plurality of network-connected devices, that a change in network connectivity associated with the network address block has occurred.

It will be understood that the various steps shown in FIG. 3-6 are illustrative only, and that steps may be removed, other steps may be used, or the order of steps may be modified.

Certain implementations of the disclosed technology are described above with reference to block and flow diagrams of systems, methods, or computer program products according to example implementations of the disclosed technology. It will be understood that one or more blocks of the block diagrams and flow diagrams, and combinations of blocks in the block diagrams and flow diagrams, respectively, may be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that may direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method comprising:
   receiving, by a computing device, from each respective network-connected device of a plurality of network-connected devices, a respective indication of a respective change in network connection status of the respective network-connected device, each respective indication of the respective change in network connection status including timing data and location data associated with the respective change in network connection status, wherein:
   the respective network-connected device has first and second network connection interfaces,
   each respective change in network connection status is associated with the first network connection interface of the respective network-connected device, and
   the respective indication of the respective change in network connection status is received, by the computing device, from the respective network-connected device through the second network connection interface of the respective network-connected device; and
   responsive to receiving, from each respective network-connected device of the plurality of network-connected devices, the respective indication of the respective change in network connection status of the respective network-connected device, determining, by the computing device, and based on the timing data and the location data associated with the change in network-connection status of the plurality of network-connected devices, that a change in network connectivity in a geographic region has occurred, wherein basing the determination on the timing data includes determining that a number of indications of a change in network status received during a specified time period exceeds a threshold.

2. The method of claim 1, wherein the change in network connection status comprises a loss of network connectivity through a predetermined network connection interface.

3. The method of claim 2, wherein, the predetermined network connection interface is configured to provide terrestrial network connectivity.

4. The method of claim 1, further comprising:
   determining an amount of devices, including the plurality of network-connected devices, currently configured to receive service from a service provider.

5. The method of claim 3, wherein the plurality of network-connected devices is a first plurality of network-connected devices and a second plurality of network-connected devices includes a plurality of battery-operated devices that have switched to battery power within the specified time and while within the geographic region, the plurality of battery-operated devices not included in the first plurality of network-connected devices, the method further comprising:
   receiving, by the computing device, from each respective battery-operated device from the plurality of battery-operated devices, a respective indication of a switch to battery-power at the respective the battery-operated device.

6. The method of claim 2, wherein the predetermined network connection interface is configured to provide mobile-broadband network connectivity.

7. The method of claim 1, wherein, for each respective network-connected device of the plurality of network-connected devices, the respective first network connection interface is configured to provide terrestrial network connectivity and the respective second network connection interface is configured to provide mobile-broadband network connectivity.

8. The method of claim 1, wherein, for each respective network-connected device of the plurality of network-connected devices, the respective timing data and the respective location data associated with the respective change in network connection status of the respective network-connected device comprises a timestamp and GPS data.

9. A method comprising:
   receiving, by a computing device, from each respective network-connected device of a plurality of network-connected devices, an indication of a respective change in network connection status of the respective network-connected device, wherein:
   the respective change in network-connection status of the respective network-connected device is determined based on a change in a respective stateful data connection with the respective network-connected device; and
   responsive to receiving, for each respective network-connected device of the plurality of network-connected devices, the indication of the respective change in network connection status of the respective network-connected device, determining, by the computing device, and based on timing data and location data associated with the change in network-connection status of the plurality of network-connected devices, the timing data and location data received from a web service provider, that a change in network connectivity in a geographic region has occurred, wherein basing the determination on the timing data includes determining that a number of indications of a change in network status received during a specified time period exceeds a threshold.

10. The method of claim 9, wherein, the respective change in network connection status comprises a loss of network connectivity.

11. The method of claim 9, wherein, the respective change in network connection status comprises a degradation, exceeding a predetermined threshold, of network performance.

12. The method of claim 9, wherein, for each respective network-connected device of the plurality of network-connected devices, the respective timing data and respective location data associated with the respective change in network connection status of the respective network-connected device comprises a timestamp and GPS data.

13. The method of claim 9, wherein for each respective network-connected device of the plurality of network-connected devices, the change in the respective stateful data connection with the respective network connected device is between the respective network connected device and the web service provider.

14. A method comprising:
receiving, by a computing device, from each respective network-connected device of a plurality of network-connected devices, (i) a respective indication of a change in network connection status of the respective network-connected device, and (ii) respective timing data and respective location data associated with the change in network-connection status wherein:
the respective network-connected device has first and second network connection interfaces,
the change in network connection status is associated with the first network connection interface, and
the respective indication of the change in network connection status is received, by the computing device, from the respective network-connected device through the second network connection interface; and
responsive to receiving, from each respective network-connected device of the plurality of network-connected devices, the respective indication of the change in network connection status of the respective network-connected device, determining, by the computing device, and based on the respective timing data and the respective location data associated with each network-connected device in the plurality of network-connected devices, that a network connectivity outage in a geographic region has occurred, wherein basing the determination on the respective timing data includes determining that a number of indications of a change in network status received during a specified time period exceeds a threshold.

15. The method of claim 14, wherein, the first network connection interface is configured to provide terrestrial network connectivity.

16. The method of claim 14, wherein, the second network connection interface is configured to provide mobile-broadband network connectivity.

17. The method of claim 14, wherein, for each respective network-connected device of the plurality of network-connected devices, the respective timing data and respective location data associated with the respective change in network connection status of the respective network-connected device comprises a timestamp and GPS data.

* * * * *